United States Patent [19]
Shuker

[11] Patent Number: 5,234,298
[45] Date of Patent: * Aug. 10, 1993

[54] QUICK TIE LOAD BINDING SYSTEM

[76] Inventor: Cary W. Shuker, 2404 Falling Oak, Riverside, Calif. 92506

[*] Notice: The portion of the term of this patent subsequent to Jun. 2, 2009 has been disclaimed.

[21] Appl. No.: 870,934

[22] Filed: Apr. 20, 1992

Related U.S. Application Data

[63] Continuation-in-part of Ser. No. 486,012, Feb. 26, 1990, Pat. No. 5,118,232, which is a continuation-in-part of Ser. No. 904,895, Sep. 8, 1986, abandoned.

[51] Int. Cl.$^5$ .............................. B61D 45/00
[52] U.S. Cl. ...................... 410/98; 410/100; 410/34
[58] Field of Search .............. 410/12, 34, 96, 97, 410/98, 100, 103, 120

[56] References Cited

U.S. PATENT DOCUMENTS

| | | | |
|---|---|---|---|
| 804,863 | 11/1905 | Kempton | 410/34 |
| 2,449,600 | 9/1948 | Geiger | 410/100 |
| 2,713,499 | 7/1955 | Wagner | 410/100 |
| 2,768,004 | 10/1956 | Wagner | 410/100 |
| 4,428,099 | 1/1984 | Richmond | 410/100 X |
| 5,024,567 | 6/1991 | Dominguez et al. | 410/100 |
| 5,118,232 | 6/1992 | Shuker | 410/100 X |

FOREIGN PATENT DOCUMENTS

| | | | |
|---|---|---|---|
| 163418 | 4/1904 | Fed. Rep. of Germany | 410/100 |
| 591975 | 10/1973 | Switzerland | 410/100 |

Primary Examiner—David A. Bucci
Assistant Examiner—William M. Hienz
Attorney, Agent, or Firm—Lyon & Lyon

[57] ABSTRACT

An improved system for quickly securing a load to a flat bed vehicle. Rotatable main shafts are secured on opposite sides of the load with each of the main shafts having a gear box. An access shaft couples the two main shafts together through worm gearing so that actuating the access shaft from either side of the truck actuates both main shafts. This causes the main shafts to rotate in opposite directions and pulls the binding tight across the load. A ratchet may be provided on the main shafts to also secure a position of the main shafts and allow effective motion in one direction only. The binding may be removed from the load by releasing the ratchet and rotating the main shafts in an opposite fashion.

17 Claims, 3 Drawing Sheets

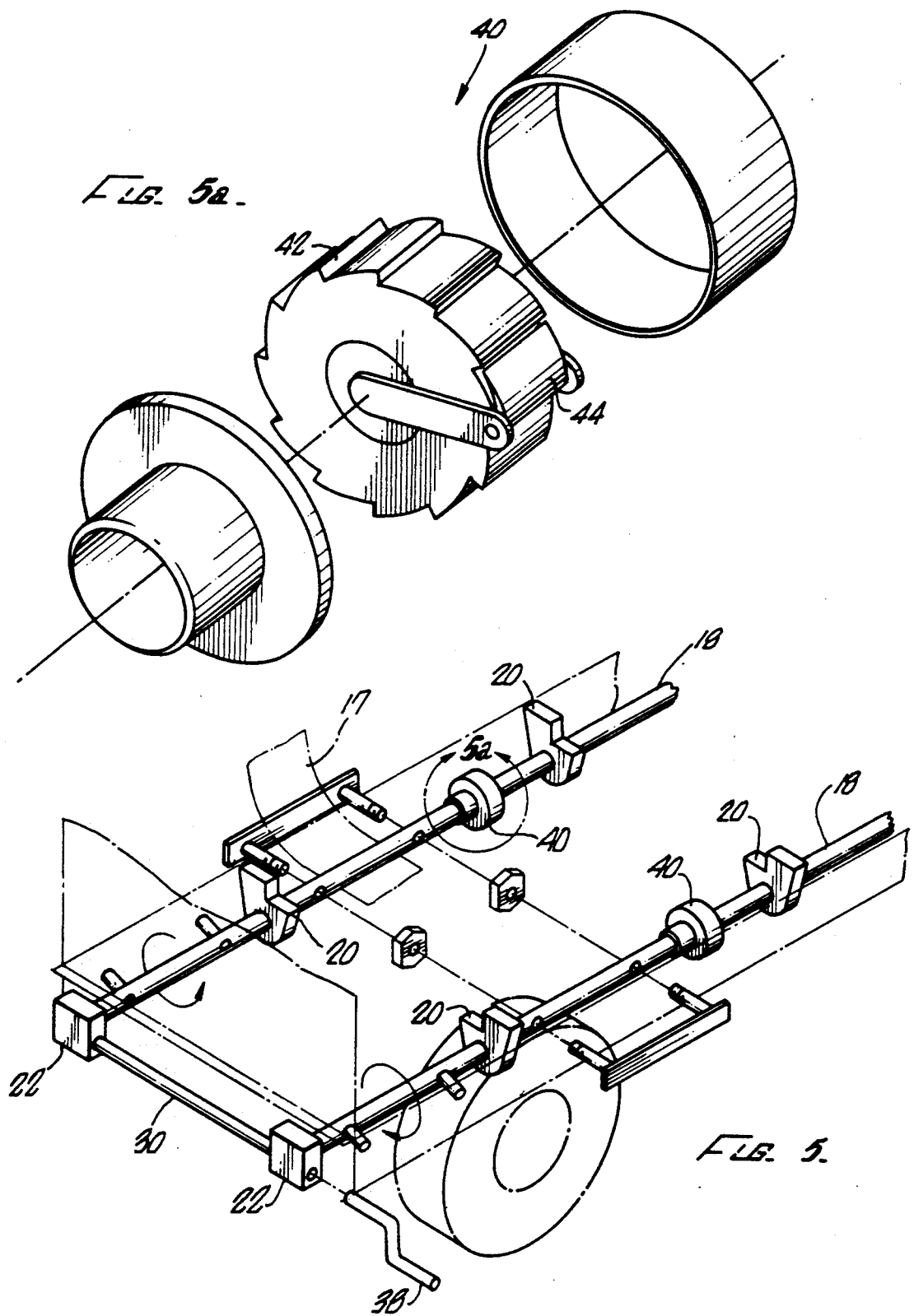

QUICK TIE LOAD BINDING SYSTEM

RELATED APPLICATION DATA

This application is a continuation-in-part of application Ser. No. 07/486,012 filed on Feb. 26, 1990 and which has issued as U.S. Pat. No. 5,118,232, which is a continuation-in-part of application Ser. No. 06/904,895 filed on Sep. 8, 1986 and now abandoned.

BACKGROUND OF THE INVENTION

The invention described and claimed herein relates generally to load binding systems for cargo vehicles, and in particular, cargo vehicles with flat beds used in the trucking and cargo carrying industries. Truckers commonly use several spaced apart ropes or straps strung across the load to secure loads to a flat bed vehicle. These ropes or straps are then individually tightened by a human operator using a series of knots, trucker's hitches or "come-along" tightening devices. This can be a very time consuming operation because it requires the operator to individually tie the ropes or straps on both sides of his truck. These methods cause the load to shift precariously due to the unequal tension applied by having the ropes or straps initially secured to only one side. This is especially a problem for high profile loads consisting of numerous stacked items. Unsecured ropes or straps may spring loose while the vehicle is underway which also imperils other vehicles on the roadway.

Also, once the cargo needs to be unloaded, additional time is lost because each of the knots or tightening devices must be individually released to remove the cargo. Other systems that use chains, complex levers and locks may also loosen an unacceptable amount while the vehicle is underway because of unsecured cargo.

SUMMARY OF THE INVENTION

This invention provides an improved system of securing loads to cargo vehicles. The system utilizes a pair of rotatable main shafts attached to a cargo vehicle and positioned on the sides of the flat bed cargo portion of the vehicle. Each main shaft is provided with a gear box and separate access shaft spans between the main shafts. The access shaft is coupled to each main shaft by a worm gearing located at the junction of the access shaft and the main shafts within the gear boxes.

The main shafts are comprised of multiple binding pegs, multiple slotted openings or U-bolt clamps. This greatly facilitates the attachment of a binding over the load. The binding pegs and U-bolt clamps may be releasably attached and removable if, for example, a full complement is not needed. This system allows a single binding, either a rope or other strapping material to secure a load to the vehicle in the following manner. The binding is initially attached at one end to one of the main shafts and is then criss-crossed over the load while being alternately secured to the main shafts by either the binding pegs, the slotted openings or the U-bolt clamps. The binding is then tightened by hand.

The operator then secures the load to the vehicle by actuating the access shaft by manual operation such as with a hand crank or by remote operation, such as with an electric motor. The access shaft may be actuated from either side of the cargo vehicle by the conventional hand crank. The rotation of the access shaft then actuates each of the main shafts causing them to simultaneously rotate in opposite directions to secure the binding to the load. A ratchet may be provided on each of the main shafts to allow effective rotation of the main shafts in one direction only. The binding on the load may also be released from a single point by simply reversing the rotation of the access shaft after releasing the ratchet. The binding may be removed in seconds using this invention compared to up to a half an hour or more with the conventional methods.

Accordingly, it is an object of the present invention to provide an improved load binding system. Other and more detailed objects and advantages will appear to those skilled in the art from the following description and the accompanying drawings, wherein.

Figure 4:
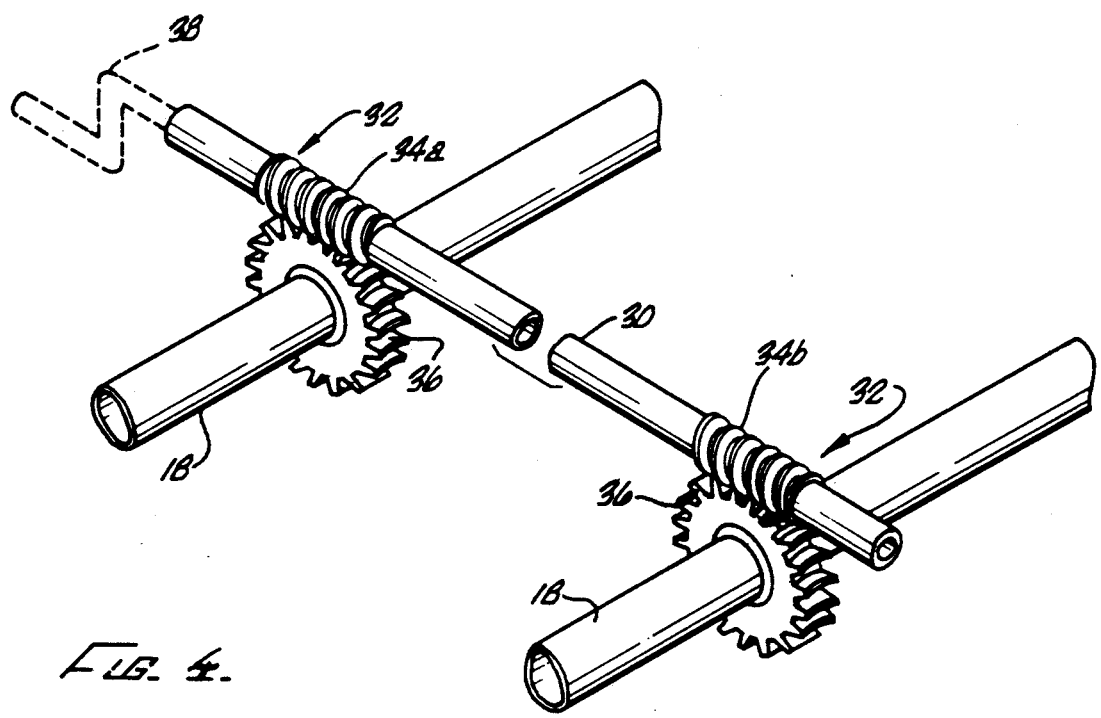

FIG. 4 further illustrates the interior of the gear boxes showing the worm gearing coupling between the access shaft and the main shafts.

FIG. 5 illustrates a perspective three quarter rear view of an embodiment having the gear boxes and access shaft located at the ends of the respective main shafts at the rear portion of the vehicle.

FIG. 5a illustrates an internal view of the ratchet positioned on the main shafts.

DETAILED DESCRIPTION OF THE PREFERRED EMBODIMENT

Figure 1:
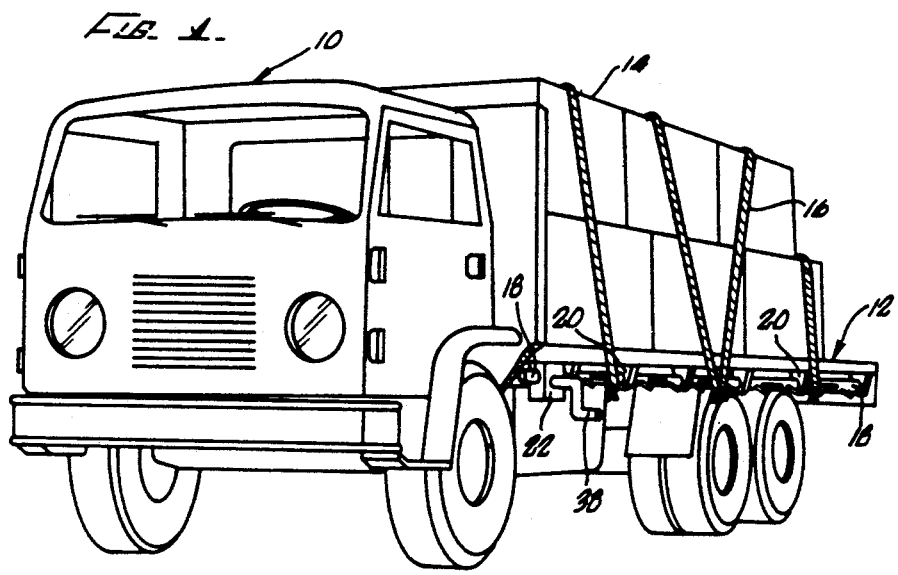
FIG. 1 is a perspective three quarter front view of a loaded flat bed vehicle with the Improved Load Binding System of the present invention with the gear boxes positioned near the cab portion of the flat bed vehicle.
Figure 2:
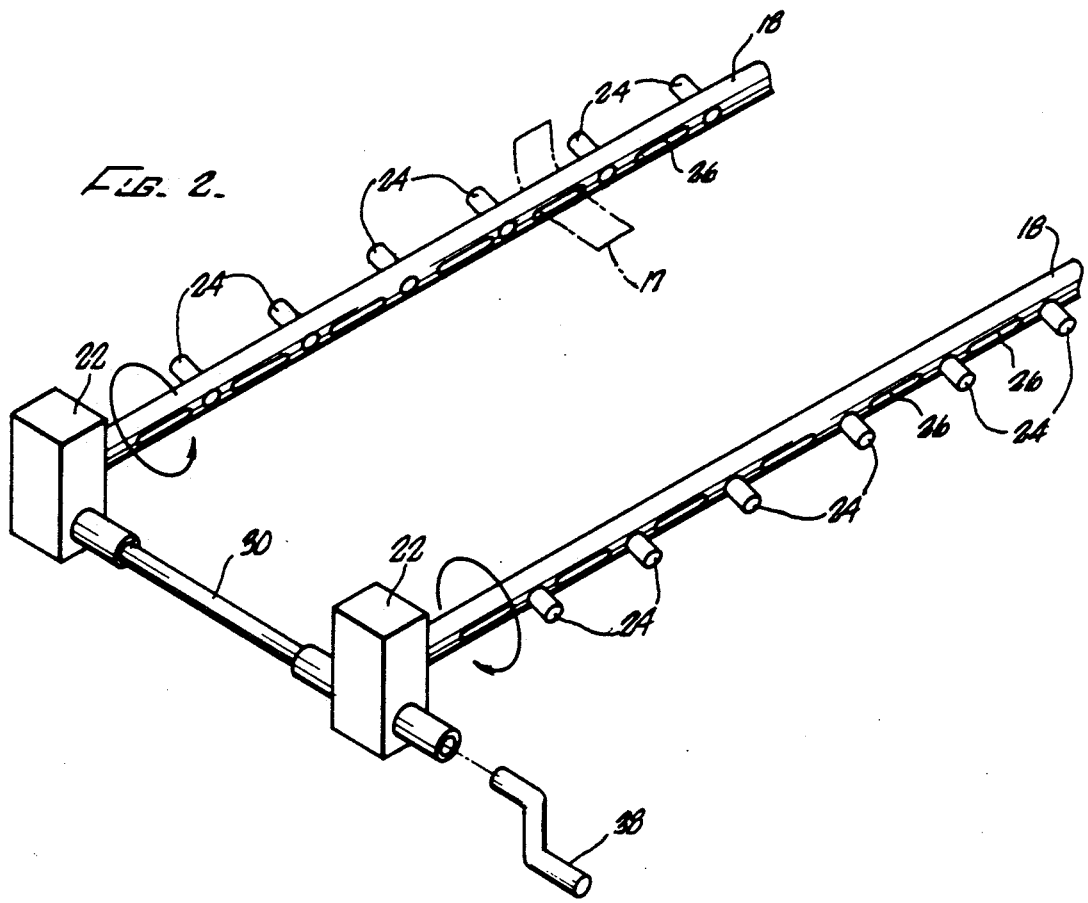
FIG. 2 is the same perspective three quarter front view of FIG. 1 without the flat bed vehicle illustrating the main shafts, the gear boxes, the access shaft and the hand crank with the gear boxes positioned at the front ends of the main shafts.
Figure 3:
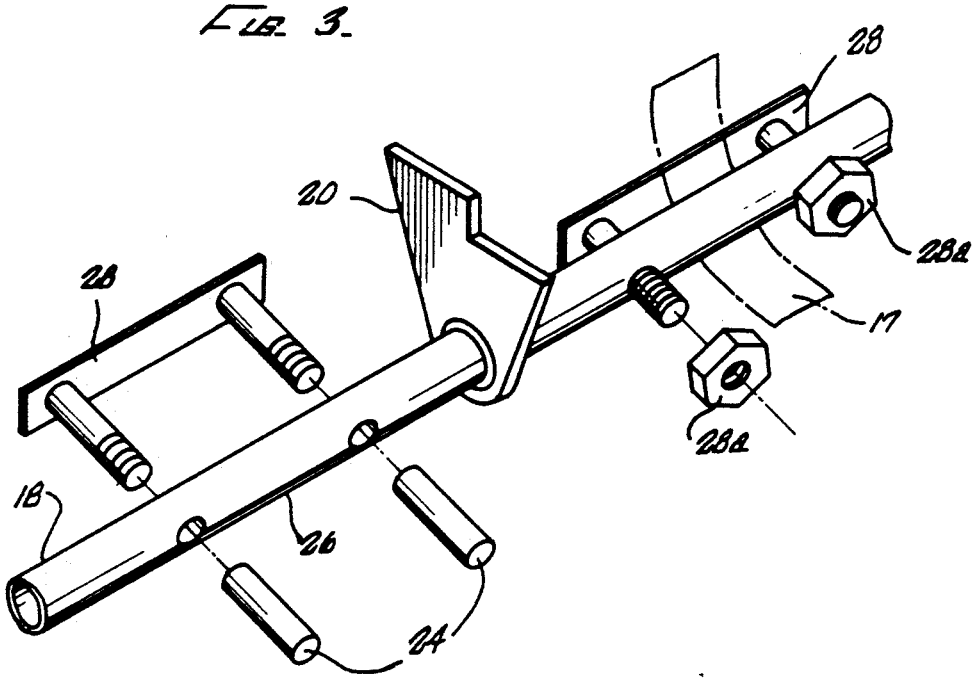
FIG. 3 illustrates one of the mounts which attaches the main shafts to the vehicle and the U-bolt clamps placed onto the main shafts in place of the binding pegs.

Referring now to the Figures, a vehicle 10 is shown in FIG. 1 with a flat bed 12. The load 14 may consist of numerous items and be of varying heights which may require a binding 16 of considerable length. The main shafts 18 are positioned on opposite sides of the load 14 and span the length of the flat bed 12 of the vehicle 10. These main shafts 18 may be secured to the vehicle 10 by a plurality of mounts 20 as shown in FIG. 1 and as illustrated in FIG. 3. As shown in FIG. 1, each main shaft 18 is comprised of a gear box 22 which is located intermediate to the ends of the main shafts 18 and which can be located near the cab of the vehicle 10 along each main shaft 18. FIG. 2 shows the gear boxes 22 positioned at the front end of the main shafts 18 in even closer proximity to the cab portion of the vehicle 10. Each of the main shafts 18 comprise a plurality of binding pegs 24 and multiple slotted openings 26 placed between each pair of binding pegs 24. The binding pegs 24 may be held in place by friction onto the main shafts 18. If fewer binding pegs 24 are needed, they may be removed as shown in FIG. 3. The slotted openings 26 are used to secure a flat strap 17 as shown in FIG. 2. Alternatively, U-bolt clamps 28 may be positioned on the main shafts 18 in place of the binding pegs 24 to secure a binding 16 which is substantially flat, such as a strap 17 as shown in FIGS. 3 and 5. In the preferred embodiment, the binding pegs 24 can be spaced 8 inches center to center. The U-bolt clamps 28 are placed onto the main shafts 18 in place of the binding pegs 24 and then may be secured onto the main shafts 18 by lock nuts 28a as shown in FIG. 3.

The access shaft 30 is coupled to each main shaft 18 within the gear box 22 and the access shaft 30 may extend out beyond the gear boxes 27. The preferred coupling between the main shafts 18 and the access shaft 30 is by a gear means or conventional worm gearing 32 as shown in FIG. 4. A worm gearing 32 is desirable when the access shaft 30 is in a generally perpendicular relationship to the main shafts 18. This allows the worm gearing 32 to transmit or impart the rotation of the access shaft 30 to the main shafts 18. As shown in FIG. 4, the worms 34a and 34b are positioned on the access shaft 30 to couple to the gear teeth 36 on each of the main shafts 18.

To secure the load 14 to the flat bed 12, the binding 16 is first secured to one of the main shafts 18 and then pulled across a portion of the load 14 to one of the binding pegs 24. The remaining portion of the binding 16 is then drawn back across another portion of the load 14 to another binding peg 24 on the other main shaft 18. One such criss-crossing method is shown in FIG. 1. This "criss-crossing" of the load 14 is repeated for a substantial portion of the useful length of the binding 16. The other end of the binding 16 is then also secured on one of the main shafts 18. The access shaft 30 is then actuated by a hand crank 38 from either side of the load 14 at either one of the gear boxes 22. The rotation of the access shaft 30 is transmitted through the worm gearing 32 to the main shafts 18. This also simultaneously actuates the main shafts 18 causing them to simultaneously rotate in opposite directions.

FIG. 5 illustrates another embodiment of the present invention with the gear boxes 22 and the access shaft 30 located at the other end of the main shafts 18 at the rear of the vehicle 10. A conventional ratchet 40 is positioned on each of the main shafts 18 for securing the main shafts 18 with the binding 16 in a tightened position. The ratchet 40 is illustrated in a detailed view in FIG. 5a. As shown in FIG. 5a, the ratchet 40 may be comprised of a ratchet wheel 42 and a pawl 44. The wheel 42 is comprised of inclined teeth into which the pawl 44 drops to allow effective motion in one direction only. The ratchet 40 may be comprised of more than one wheel 42 and the ratchet may be reversible whereby it may prevent a main shaft 18 from rotating in either a clockwise or counterclockwise direction. To release the binding 14, the ratchet 40 may be disengaged from the main shaft 18 and thereby allow the main shafts 18 to rotate in a direction to release the binding 14.

While embodiments and applications of this invention have been shown and described, it would be apparent to those skilled in the art that many more modifications are possible without departing from the inventive concepts herein. The invention therefore is not to be restricted except in the spirit of the appended claims.

What is claimed is:

1. An improved system for binding a load to a flat bed vehicle comprising two rotatable main shafts attached to the vehicle and extending along opposite sides of the load, each main shaft comprising multiple binding pegs for releasably securing a binding, each of said main shafts comprising a gear box, said gear boxes coupled together by a rotatable access shaft, whereby actuation of said access shaft simultaneously actuates said gear boxes and drives said two rotatable main shafts in opposite directions to secure said binding onto said load.

2. An improved system for binding a load to a flat bed vehicle comprising a plurality of rotatable main shafts attached to the vehicle and extending along opposite sides of the load, each main shaft comprising multiple binding pegs for releasably securing a binding, each main shaft also comprising a ratchet and a gear box, said gear boxes coupled together by a rotatable access shaft positioned between said gear boxes, whereby actuation of said access shaft actuates said gear boxes and simultaneously drives said rotatable main shafts in opposite directions securing said binding onto said load.

3. The improved system of claim 1 or claim 2 where said gear boxes are respectively positioned intermediate to the ends of said main shafts.

4. The improved system of claim 1 or claim 2 where said gear boxes are positioned opposite one another at one end of the respective main shafts.

5. The improved system of claim 1 or claim 2 where said binding pegs are detachable from said main shafts.

6. The improved system of claim 1 or claim 2 where said main shafts further comprise one or more U-bolt clamps which are detachable from said main shafts.

7. The improved system of claim 1 or claim 2 where said binding is a rope.

8. The improved system of claim 1 or claim 2 where said main shafts comprise multiple slotted openings.

9. The improved system of claim 1 or claim 2 where said binding is a flat strap.

10. The improved system of claim 1 or claim 2 where said access shaft is actuated by a removable hand crank.

11. The improved system of claim 1 or claim 2 where said access shaft and said main shafts are remotely actuated.

12. An improved system for securing a load to a vehicle comprising:
   (a) a plurality of rotatable main shafts attached to the vehicle and extending along opposite sides of the load, said main shafts comprising multiple detachable binding pegs or slotted openings for the attachment of a binding, each main shaft comprising a gearing means;
   (b) an access shaft coupled to the gearing means on each of the main shafts; and
   (c) a removable hand crank which releasably engages said access shaft;
   whereby actuation of said access shaft by rotating said hand crank simultaneously drives said rotatable main shafts in opposite directions securing said binding to said load.

13. The improved system of claim 12 where said gear means and said access shaft are positioned at the respective ends of said main shafts.

14. The improved system of claim 12 where each of said main shafts is further comprised of a ratchet.

15. An improved method for securing a load to a vehicle comprising the steps of:
   (a) attaching one end of a binding to one of a plurality of rotatable main shafts, said main shafts attached to the vehicle on respective sides thereof and extending along opposite sides of the load, each of said main shafts comprised of a gear box;
   (b) successively looping said binding across the load and then releasably securing a portion of said binding onto another main shaft for the useful length of said binding means;
   (c) attaching the other end of the useful length of said binding to one of said main shafts;

(d) pulling the binding tight across the load by actuating a single rotatable access shaft coupled to said gear boxes which simultaneously actuates said gear boxes and causes rotation of the main shafts in opposite directions.

16. The method of claim 15 where said binding is a rope and is releasably secured to the main shafts by a plurality of binding pegs.

17. The method of claim 15 where said binding is a flat strap and is releasably secured to the main shafts by multiple slotted openings or multiple U-bolt clamps positioned on said main shafts.

* * * * *

UNITED STATES PATENT AND TRADEMARK OFFICE
CERTIFICATE OF CORRECTION

PATENT NO. : 5,234,298
DATED : August 10, 1993
INVENTOR(S) : Cary W. Shuker It is certified that error appears in the above-identified patent and that said Letters Patent is hereby corrected as shown below:

On title page, item [54] and col. 1, line 1, in the title, should read
--LOAD BINDING SYSTEM--

Signed and Sealed this

Twelfth Day of April, 1994

Attest:

BRUCE LEHMAN

*Attesting Officer*  *Commissioner of Patents and Trademarks*